(12) United States Patent
Kushler et al.

(10) Patent No.: US 9,189,155 B2
(45) Date of Patent: Nov. 17, 2015

(54) SYSTEMS AND METHODS FOR USING ENTERED TEXT TO ACCESS AND PROCESS CONTEXTUAL INFORMATION

(75) Inventors: Clifford A. Kushler, Lynnwood, WA (US); Jane Manning, Palo Alto, CA (US); Mike McSherry, Seattle, WA (US); Aaron Sheedy, Seattle, WA (US)

(73) Assignee: NUANCE COMMUNICATIONS, INC., Burlington, MA (US)

( * ) Notice: Subject to any disclaimer, the term of this patent is extended or adjusted under 35 U.S.C. 154(b) by 105 days.

(21) Appl. No.: 13/301,732

(22) Filed: Nov. 21, 2011

(65) Prior Publication Data

US 2012/0127083 A1 May 24, 2012

Related U.S. Application Data

(60) Provisional application No. 61/415,828, filed on Nov. 20, 2010.

(51) Int. Cl.
G09G 5/00 (2006.01)
G06F 3/041 (2006.01)
G06F 3/0488 (2013.01)

(52) U.S. Cl.
CPC .................................. G06F 3/04886 (2013.01)

(58) Field of Classification Search
CPC .................................. G06F 17/27; G09G 5/00
See application file for complete search history.

(56) References Cited

U.S. PATENT DOCUMENTS

| 5,502,803 | A | * | 3/1996 | Yoshida et al. | 715/201 |
|---|---|---|---|---|---|
| 5,781,663 | A | | 7/1998 | Sakaguchi et al. | |
| 6,999,955 | B1 | * | 2/2006 | Horvitz | 706/45 |
| 7,098,896 | B2 | | 8/2006 | Kushler et al. | |
| 7,251,367 | B2 | | 7/2007 | Zhai | |
| 7,382,358 | B2 | | 6/2008 | Kushler et al. | |
| 7,453,439 | B1 | | 11/2008 | Kushler et al. | |
| 7,480,619 | B1 | * | 1/2009 | Scott | 704/275 |
| 7,542,029 | B2 | | 6/2009 | Kushler | |
| 8,319,742 | B2 | * | 11/2012 | Doktorova et al. | 345/173 |
| 8,479,118 | B2 | | 7/2013 | Lyndersay et al. | |
| 8,626,823 | B2 | | 1/2014 | Kumar | |
| 2002/0188454 | A1 | * | 12/2002 | Sauber | 704/275 |
| 2003/0023952 | A1 | | 1/2003 | Harmon | |
| 2005/0146508 | A1 | * | 7/2005 | Kirkland et al. | 345/169 |
| 2005/0240576 | A1 | | 10/2005 | Piscitello | |
| 2006/0024126 | A1 | | 2/2006 | Johansson et al. | |
| 2006/0253793 | A1 | * | 11/2006 | Zhai et al. | 715/773 |
| 2007/0130117 | A1 | | 6/2007 | Lapstun et al. | |
| 2008/0059570 | A1 | * | 3/2008 | Bill | 709/203 |
| 2008/0174570 | A1 | * | 7/2008 | Jobs et al. | 345/173 |

(Continued)

OTHER PUBLICATIONS

International Search Report for International Application No. PCT/US2011/61536, Date of Mailing: Jul. 25, 2012, 12 pages.

(Continued)

*Primary Examiner* — Ilana Spar
*Assistant Examiner* — Paras D Karki
(74) *Attorney, Agent, or Firm* — Perkins Coie LLP

(57) ABSTRACT

A system and method for commanding a keyboard application based on a gesture received at a displayed keyboard is described. In some examples, the system receives a gesture, such as a shape-based or key-based gesture, identifies a command associated with the received gesture, and performs a function (e.g. changes mode of the keyboard, hides the keyboard, and so on), based on the identified command.

21 Claims, 6 Drawing Sheets

(56) References Cited

U.S. PATENT DOCUMENTS

| | | |
|---|---|---|
| 2008/0316183 A1 | 12/2008 | Westerman et al. |
| 2009/0125511 A1 | 5/2009 | Kumar |
| 2009/0150826 A1 | 6/2009 | Lyndersay et al. |
| 2010/0073329 A1 | 3/2010 | Raman et al. |
| 2010/0185949 A1* | 7/2010 | Jaeger ............... 715/730 |
| 2010/0235726 A1* | 9/2010 | Ording et al. ............... 715/234 |
| 2010/0245261 A1 | 9/2010 | Karlsson |
| 2011/0279384 A1* | 11/2011 | Miller et al. ............... 345/173 |
| 2011/0314427 A1* | 12/2011 | Sundararajan ............... 715/863 |
| 2012/0127080 A1 | 5/2012 | Kushler et al. |
| 2012/0127082 A1 | 5/2012 | Kushler et al. |

OTHER PUBLICATIONS

International Search Report for International Application No. PCT/US2011/61530, Date of Mailing: Jul. 30, 2012, 3 pages.

International Search Report for International Application No. PCT/US2011/61730, Date of Mailing: Jul. 30, 2012, 3 pages.

\* cited by examiner

SYSTEMS AND METHODS FOR USING ENTERED TEXT TO ACCESS AND PROCESS CONTEXTUAL INFORMATION

PRIORITY CLAIM

This application claims the benefit of U.S. Provisional Application Ser. No. 61/415,828 filed Nov. 20, 2010, the contents of which are hereby incorporated by reference.

BACKGROUND OF THE INVENTION

The origin of the modern keyboard as the primary method for inputting text from a human to a machine dates back to early typewriters in the 19th century. As computers developed, it was a natural evolution to adapt the typewriter keyboard for use as the primary method for inputting text. For a skilled typist, the keyboard has remained the fastest way possible to input text into a computer or other data processing device.

With ongoing efforts to make computers smaller and more portable, the physical keyboard has become one of the most significant limiting factors in just how small a computing device can become: the physical size of the human finger is not something computer designers can change. As a result, computing devices for certain portable applications, such as mobile devices and tablet computers, have been designed without a physical keyboard, and instead use a touch-screen or virtual keyboard as a primary interface between a device and a human user.

Despite being implemented via a touch-screen, a virtual keyboard is often utilized merely as a mechanism in which to receive text input from a user. That is, although many innovations have delivered keyboards that are useful for modern devices, a typical virtual keyboard still functions like its predecessors, by only functioning to receive text entry from a user. This is similar to what a physical keyboard or early typewriters enable a user to do on a device, receive text input from a user.

Therefore, the need exists for a system that overcomes the above problems, as well as one that provides additional benefits. Overall, the examples herein of some prior or related systems and their associated limitations are intended to be illustrative and not exclusive. Other limitations of existing or prior systems will become apparent to those of skill in the art upon reading the following Detailed Description.

DETAILED DESCRIPTION

Overview

A system and method for utilizing gestures as commands for a keyboard application is described. In some examples, the system receives a gesture, identifies a command, instruction, performable function, and/or performable action associated with the received gesture, and performs an action with a keyboard application that is based on the identified command. That is, the system may perform various functions (e.g., hide a keyboard, change the keys displayed on the keyboard, and so on) upon receiving a gesture from a user of a mobile device, such as a smart phone, tablet computer, or any other computing device that includes a displayed keyboard.

In some examples, the system performs functions associated with a keyboard application in response to receiving a shape-based gesture. For example, the system may consider a shape (e.g., an arrow, a number, a letter, a circle, and so on) traced on or traced proximate to a keyboard displayed via a touch-screen to be a gesture, and perform a function associated with the traced shape.

In some examples, the system performs functions associated with a keyboard application in response to receiving a key-based gesture. For example, the system may consider a path drawn from a beginning key (e.g., such as a special <start> key on a keyboard) to an end key or keys (e.g. the <backspace> key, the F key, and so on) to be a gesture, and perform a function based on the traced path and/or on the ending key.

The system will now be described with respect to various embodiments. The following description provides specific details for a thorough understanding of, and enabling description for, these embodiments of the system. However, one skilled in the art will understand that the system may be practiced without these details. In other instances, well-known structures and functions have not been shown or described in detail to avoid unnecessarily obscuring the description of the embodiments of the system.

It is intended that the terminology used in the description presented below be interpreted in its broadest reasonable manner, even though it is being used in conjunction with a detailed description of certain specific embodiments of the system. Certain terms may even be emphasized below; however, any terminology intended to be interpreted in any restricted manner will be overtly and specifically defined as such in this Detailed Description section.

Suitable System

Figure 1:
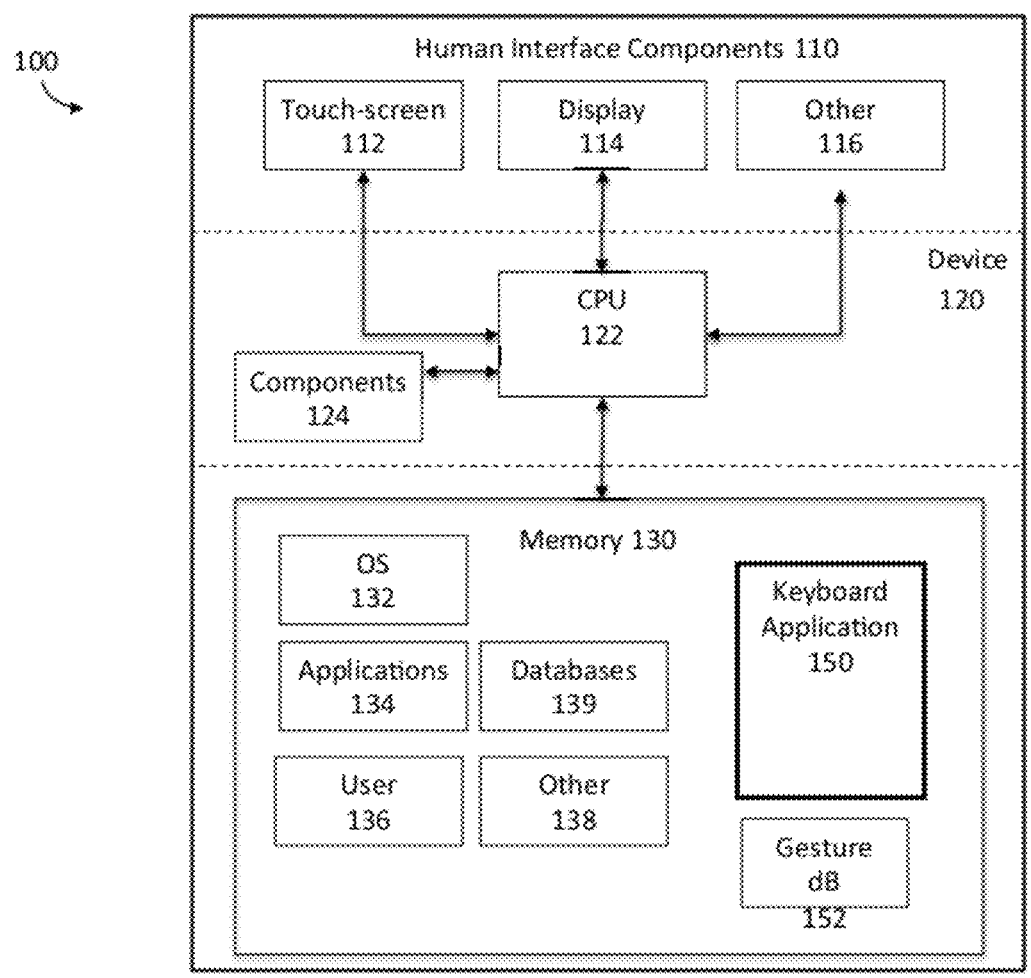
FIG. 1 is a block diagram illustrating components of a mobile device or other suitable computing device.
Figure 2:
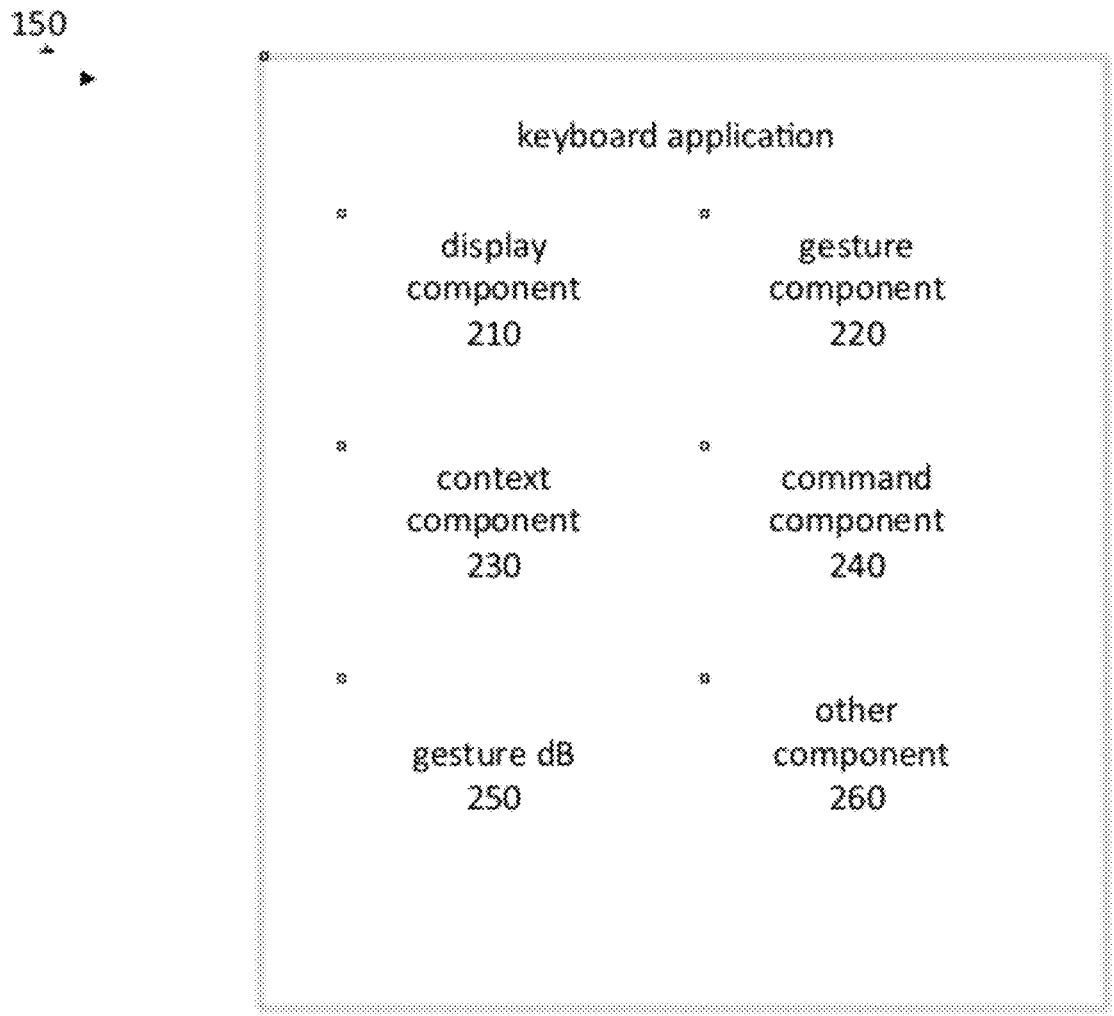
FIG. 2 is a block diagram illustrating components of a keyboard application of a computing device.

FIG. 1 illustrates a block diagram of a computing device 100 on which a keyboard application capable of performing functions in response to gesture-based commands can be supported. The computing device 100 may be a mobile device, smart-phone, tablet computer, net-book, mobile GPS navigation device, remote control, fixed telephone or communications console or apparatus, surface or tabletop computer, overhead image projector, desktop computer, e-reader, ATM machine, vending machine, set-top box, gaming device, or any other device having a keyboard, such as a virtual or touch-screen based keyboard, presented by a user interface of the device. The computing device 100 includes various hardware and/or software components configured to perform functions based on gestures received by a keyboard of the computing device 100. For example, the computing device 100 includes various human interface components 110, device components 120, and memory 130.

The computing device 100 includes a touch-screen 112 or other input component that provides input to a processor 122, such as input notifying the processor 122 of contact events when the touch-screen is touched. The touch-screen may include or communicate with a hardware controller, such as a touch-screen driver, that interprets raw signals received from the touch-screen and transmits information associated with the contact event (e.g., indication of a button or key press, X-Y coordinates of a point of contact (such as from a finger or stylus touch on a touch screen, touch pad, or graphics tablet), a gesture, a swipe path or traced path, a request by a user to press a physical or virtual key, the current position of a pointing input device, an area of contact, pressure, duration, and so on, to the processor 122. For example, the hardware controller may transmit information associated with a variety of pointing devices, including a mouse, a trackball, a joystick or analog stick, a pointing stick or nipple mouse, a roller mouse, a foot mouse, a palm mouse, a light pen, a light gun, a positional gun, a laser pointer, a gyroscope or gyroscopic mouse, an accelerometer, an eye tracking device, a video tracking device, a stylus, and so on. The processor 122 communicates with a hardware controller or driver associated with a display 114 to display information (e.g., letters of contacted keys on a displayed keyboard) associated with detected contact events. The display 114 may be integrated into computing device 100, may be part of touch-screen 112, or may be a stand-alone device. Example displays 114 include a touch-screen display, a flat panel display, a cathode ray tube, an electronic ink display, a head-mounted display, a liquid crystal display, a light-emitting diode display, a plasma panel display, an electro-luminescent display, a vacuum fluorescent display, a digital projector, a laser projector, a heads-up display, and so on. The device 114 may include other interface components 116, such a speaker that provides appropriate auditory signals to assist a user in navigating a displayed keyboard or other displayed component.

The computing device 100 may include various device components 124, such as sensors (e.g., GPS or other location determination sensors, motion sensors, gyroscopes, light sensors, and so on), removable storage devices (e.g., SIM cards), cameras and other video capture devices, microphones and other audio capture devices, communication devices (e.g., Bluetooth devices, radios, antennas), and so on.

The processor 122 may communicate with data or applications stored in memory 130 of the device 100, which may include a combination of temporary and/or permanent storage, and both read-only and writable memory (random access memory or RAM), read-only memory (ROM), writable non-volatile memory such as FLASH memory, hard drives, floppy disks, SIM-based components, and so on. The memory component includes various program components or modules, such as an operating system 132, and various applications 134, such as applications downloaded to the device 100. For example, the memory 130 may store applications native to the device that perpetually operate on the device (e.g., a keyboard application that provides a virtual keyboard, a text messaging application, and so on) as well as applications that are downloaded by a user and launched by the device (e.g., applications associated with social networking sites, games, and so on).

For example, the memory 130 may store a keyboard application, such as a keyboard application responsive to gesture-based commands. The keyboard application 150, which may include a gesture database 152 that stores data about gestures and associated commands, among other things, provides, in some examples, greater functionality over standard keyboard applications, such as functionality that enables the keyboard to perform functions associated with a displayed keyboard and in response to gestures received from users, among other things. Further details regarding the keyboard application 150 and its functionality are described herein.

The memory component 130 also includes various data storage components, such as a user data database 136, or other databases 139 that provide and/or store information for applications executed by the device 100. For example, the user database 136 may store information associated with a user of the device 100, such as contact information, subscriber information, biographical information, use information, trend information, preference information, and so on.

In general, the computing device 100 may store or contain any and all components, modules, or data files required or used by the device 100 and/or the keyboard application 150 when performing actions, among other things.

FIG. 1 and the discussion herein provide a brief, general description of a suitable computing environment in which the keyboard application 150 can be implemented. Although not required, aspects of the system are described in the general context of computer-executable instructions, such as routines executed by a general-purpose computer, e.g., mobile device, a server computer, or personal computer. Those skilled in the relevant art will appreciate that the system can be practiced with other communications, data processing, or computer system configurations, including: Internet appliances, hand-held devices (including tablet computers and/or personal digital assistants (PDAs)), all manner of cellular or mobile phones, multi-processor systems, microprocessor-based or programmable consumer electronics, set-top boxes, network PCs, mini-computers, mainframe computers, and the like. Indeed, the terms "computer," "host," and "host computer," and "mobile device" and "handset" are generally used interchangeably herein, and refer to any of the above devices and systems, as well as any data processor.

Aspects of the system can be embodied in a special purpose computing device or data processor that is specifically programmed, configured, or constructed to perform one or more of the computer-executable instructions explained in detail herein. Aspects of the system may also be practiced in distributed computing environments where tasks or modules are performed by remote processing devices, which are linked through a communications network, such as a Local Area Network (LAN), Wide Area Network (WAN), or the Internet. In a distributed computing environment, program modules may be located in both local and remote memory storage devices.

Aspects of the system may be stored or distributed on computer-readable media (e.g., physical and/or tangible computer-readable storage media), including magnetically or optically readable computer discs, hard-wired or preprogrammed chips (e.g., EEPROM semiconductor chips), nano-technology memory, or other data storage media. Indeed, computer implemented instructions, data structures, screen displays, and other data under aspects of the system may be distributed over the Internet or over other networks (including wireless networks), on a propagated signal on a propagation medium (e.g., an electromagnetic wave(s), a sound wave, etc.) over a period of time, or they may be provided on any analog or digital network (packet switched, circuit switched, or other scheme). Those skilled in the relevant art will recognize that portions of the system reside on a server computer, while corresponding portions reside on a client computer such as a mobile or portable device, and thus, while certain hardware platforms are described herein, aspects of the system are equally applicable to nodes on a network. In an alternative embodiment, the mobile device or portable device may represent the server portion, while the server may represent the client portion.

Components of a Gesture Supported Keyboard Application

As described herein, in some examples, the keyboard application 150 includes components that enable a user of a mobile device to perform actions via a keyboard presented to the user via a touch-screen or other user interface of the mobile device. That is, in some examples, the keyboard application 150 recognizes gestures as processing commands for the keyboard application, and performs functions associated with the commands. For example, the keyboard application may edit and/or modify text, change modes of operation, change some or all of a displayed keyboard, and so on, based on receiving a gesture-based command. Thus, the keyboard application may perform multiple functions, a function of facilitating the entry of text from a user, and another function of performing actions based on gesture-based commands received via and/or proximate to a displayed keyboard.

The keyboard is a useful place to add functionality. Typically, the keyboard is a layer of software that is often or always accessible when using a computing device and its various applications. Therefore, adding other functionality within or associated with a keyboard would provide many benefits, such as enhanced editing of text, navigation between keyboard modes, navigation between keyboard actions, recalling and/or hiding the keyboard, and other benefits. Various components of the keyboard application that may perform such techniques will now be discussed.

In some examples, the keyboard application 150 includes a display component 210 configured to display a virtual keyboard and perform typical keyboard functions. For example, the display component 210 may include components of conventional keyboard applications, such as components that may provide a text input functionality, a key tap functionality, a swipe, gesture, and/or contact movement functionality, or any other functionality that facilitates the reception of text-based input from a user via a displayed and/or virtual keyboard. That is, the display component 210 may cause a computing device 100 to display a keyboard via a touch-screen 120, and receive input via a displayed keyboard presented via the touch-screen 120. The keyboard may be a physical keyboard or a virtual keyboard, such as any keyboard that is implemented on a touch-sensitive surface, a keyboard presented on a touch-sensitive display, a keyboard imprinted on a touch-sensitive surface, and so on. Example keyboards include a keyboard displayed on a monitor, a keyboard displayed on a touch-screen, a keyboard optically projected onto a flat or curved surface, or a physical keyboard with electronically changeable key symbols integrated into the keys, and so on. In some cases, the keyboard may be "virtually" touched, such as a screen or projection that is controlled with some sort of pointer device or gesture recognizer. Further details regarding suitable text input applications provided by the display component 210 may be found in commonly-assigned U.S. Pat. No. 7,542,029, issued on Jun. 2, 2009, entitled SYSTEM AND METHOD FOR A USER INTERFACE FOR TEXT EDITING AND MENU SELECTION, which is incorporated by reference in its entirety.

In some examples, a text input application provided by the display component 210 may perform recognition and/or disambiguation techniques to entered text when a user is inputting text. For example, the display component 210 may provide a text input application that receives text entry when a user traces a continuous path on a virtual keyboard. Such as text entry application is described in more detail in U.S. Pat. No. 7,098,896, issued on Aug. 29, 2006, entitled SYSTEM AND METHOD FOR CONTINUOUS STROKE WORD-BASED TEXT INPUT, which is incorporated by reference in its entirety.

In some examples, the keyboard application 150 includes a gesture component 220 configured to receive, monitor and/or review gestures received by the keyboard application and determine one or more commands are associated with received gestures, a context component 230 configured to identify and/or determine a context associated with the received gestures, a command component 240 configured to perform or cause to perform the determined one or more commands, a database 250 that stores information associated with received gestures, associate commands, and/or other components 260 that facilitate operation of the keyboard application 150, such as those described herein.

As described herein, in some examples, the gesture component 220 identifies one or more "gestures" received from a user via the keyboard application 150. A gesture is movement of a finger (or stylus) across and/or proximate to a screen to enter data on a keyboard, to interact with applications, and/or to indicate various other user intentions. For example, a gesture may be a path traced on or proximate to a virtual keyboard, a shape drawn on or proximate to a virtual keyboard, and/or other movements on or proximate to a virtual keyboard. In some cases, the keyboard application 150 may receive a gesture without any contact between a user and the keyboard. For example, a receive gesture may be a certain movement of the device 100, detected by a gyroscope within the device 100, or a movement of a pointer over a virtual display, detected by a camera of the device 100.

The keyboard application 150 may store information associated with gestures in a database, such as gesture database 250, or gesture database 152. The stored information may include information associating gestures to commands, functions, actions, instructions and so on, information associated with user settings (e.g., account information for a user or preference information for a user), and so on. Such information may enable the keyboard application 150 to determine and process commands based on gestures received via the virtual keyboard, among other benefits.

In some examples, the context component 230 may provide information to the gesture component 220 and/or the command component 240 associated with a context in which a gesture was received. For example, the context component 230 may provide information associated with the user of the mobile device, the preferences of the user of the mobile device, the application currently running on the mobile device, the experience level of the user of the mobile device, the mode of operation of the keyboard application, historical information associated with the user of the mobile device, and so on.

In some cases, the gesture component 220 may utilize the information provided by the context component 230 when determining a command to associate with a received gesture. For example, there may be instances where two or more commands can be associated with a received gesture, and the gesture component 220 may utilize such information to resolve the ambiguities that may arise in such instances.

Similarly, in some cases, the command component 240 may utilize the information provided by the context component 230 when determining how to process and/or perform a command associated with a received gesture. For example, there may be instances where a command can be processed in many different ways (e.g., a changing the font of a word versus changing the font of a sentence) can be associated with a received gesture, and the command component 220 may utilize such information to resolve the ambiguities that may arise in such instances.

Gesture-Based Commands

Figure 3:
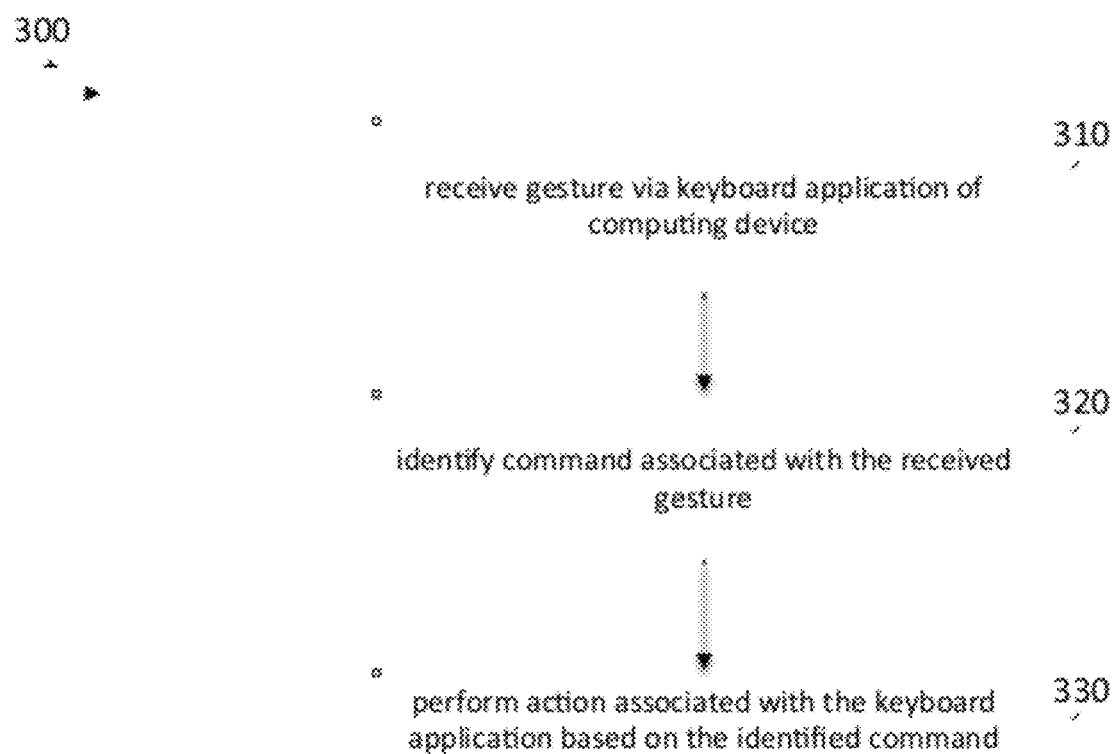
FIG. 3 is a flow diagram illustrating a routine for commanding a keyboard application using a gesture received from a user.

As described herein, in some examples, the system processes commands within a keyboard application in response to receiving gestures via or proximate to a keyboard application supported by a mobile device. FIG. 3 is a flow diagram illustrating a routine 300 for commanding a keyboard application using a gesture received from a user.

In step 310, the system receives a gesture via a keyboard application of a computing device. For example, the gesture component 220 receives information from a touch-screen driver associated with a gesture performed via or proximate to a virtual keyboard displayed by the touch-screen. In some cases, the received gesture is a shape-based gesture that is unassociated with specific keys of the keyboard. Example shape-based gestures include letters, numbers, geometrical shapes, pictures, sketches, user-created shapes, free-form shapes, symbols, and so on. In some cases the received gesture is a key-based gesture, discussed in more detail herein.

In step 320, the system identifies a command associated with the received gesture. For example, the gesture component 220 performs a lookup operation or other technique on a data structure, such as a table stored in memory of the computing device, in order to identify the command and/or commands associated with the received gesture. Table 1 is a table representing an example data structure suitable to be the recipient of a lookup operation, where the table includes entries relating shape-based gestures with commands to be processed by the keyboard application 150:

TABLE 1

| Gesture | Command |
| --- | --- |
| Up arrow | "maximize keyboard" |
| Down arrow | "minimize keyboard" |
| X | "hide keyboard" |
| # | "show numbers on keyboard" |
| ? | "change language of keyboard" |
| B | "change text font to bold" |
| I | "change text font to italics" |
| Underlining text | "insert hyperlink" |
| Clockwise Circle | "change text to larger font" |
| Counterclockwise Circle | "change text to smaller font" |

Of course, one of ordinary skill in the art will appreciate that other gestures and/or commands may be provided by the system.

In step 330, the system processes the identified command, and performs an action and/or function associated with the keyboard application based on the identified command. For example, the command component 240 receives an indication from the gesture component 220 that a user provided a gesture associated with hiding the keyboard, and causes the keyboard to be removed from the display.

In some examples, the system may support user-defined and/or user-supplied gestures for certain commands and/or actions. For example, the system may provide one or more screens that facilitate the entry or selection of user-defined gestures for certain commands and/or actions. The system may provide these user-defined gestures across all applications, across a specific application, and so on.

In fact, in some cases, the system may provide certain gestures as global gestures across all applications supported by a computing device, while in other cases the system may provide certain gestures as gestures specific to a current application running on a device. For example, a browser currently running on a device may support a gesture associated with a command to insert "www" and ".com" into a text string, while other applications may not support such a gesture.

Figure 4A:
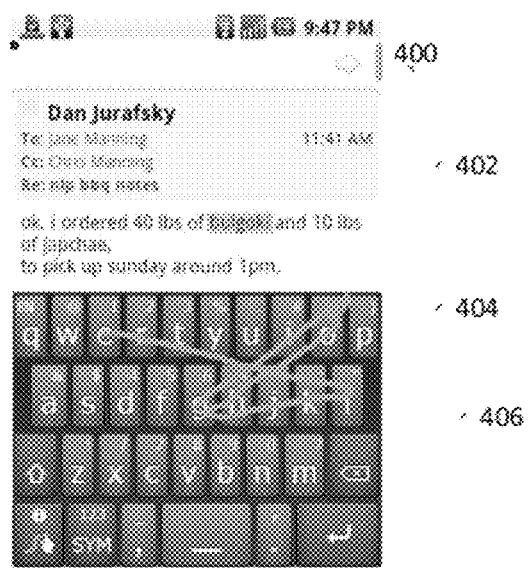
FIGS. 4A-4B are screen shots illustrating shape-based gestures performed with respect to a displayed keyboard.
Figure 4B:
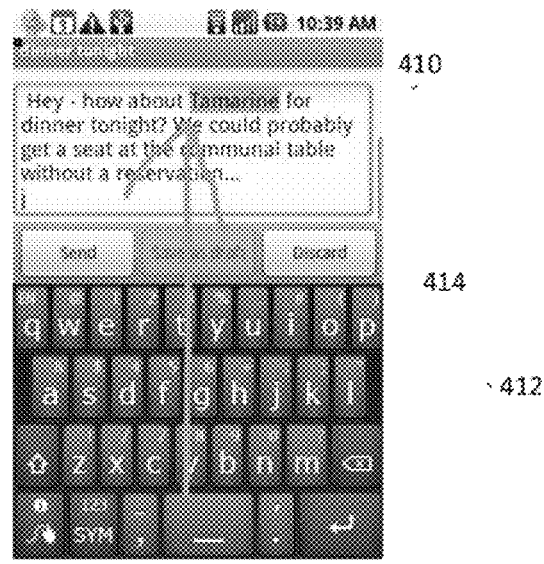

FIGS. 4A-4B are screen shots illustrating gestures traced on a displayed keyboard that are associated with processing commands for a keyboard application. FIG. 4A depicts a display screen 400 having a virtual keyboard 406. In response to an email application highlighting a possibly misspelled word 402 of "bulgoki," a user inputs a gesture 404 of an "X," which will cause the keyboard application to perform a spellcheck operation for the word 402 "bulgoki." The keyboard application may, in response to the spellcheck operation, provide a list of alternative spellings (e.g, "bulgogi," "pulgogi") for the user to select (not shown).

FIG. 4B depicts a display screen 410 having a virtual keyboard 412. A user inputs a gesture 414 of an up arrow, seeking to maximize the keyboard in order to enter additional text into the text editor. The up arrow gesture 414 is unassociated with any keys of the keyboard 412, and could be traced anywhere over or partially over the keyboard to initiate the same processing command of maximizing the keyboard. Of course, one of ordinary skill in the art will realize that the system may utilize other gestures not explicitly described herein when initiating process commands within a keyboard application.

Figure 5:
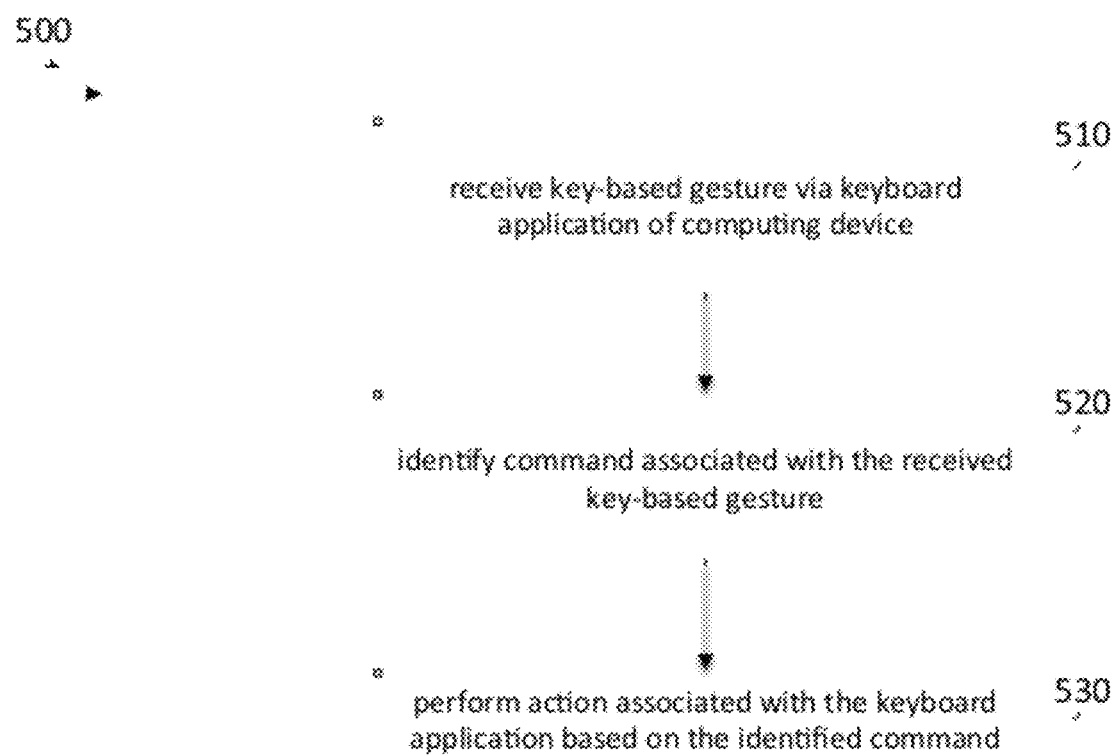
FIG. 5 is a flow diagram illustrating a routine for commanding a keyboard application using a key-based gesture received from a user.

In addition to the shape-based and other gestures described herein, the system, in some examples, may utilize key-based gestures as requests to perform functions and/or actions associated with a keyboard application supported by a computing device. FIG. 5 is a flow diagram illustrating a routine 500 for commanding a keyboard application using a key-based gesture received from a user.

In step 510, the system receives a key-based gesture via a keyboard application of a computing device. For example, the gesture component 220 receives information from a touch-screen driver associated with a gesture performed via or proximate to one or more keys of a virtual keyboard displayed by the touch-screen. The gesture may be a path, line, or other drawn form that starts at a key representative of a starting point for a gesture (e.g., a "swype" key, a "start" key, the "G" key, and so on) and ends at a second, different key, possibly including other keys. That is, a key-based gesture may be a path over two keys, three keys, or N keys on a keyboard.

In step 520, the system identifies a command associated with the received key-based gesture. For example, the gesture component 220 performs a lookup operation or other technique on a data structure, such as a table stored in memory of the computing device, in order to identify the command and/or commands associated with the received key-based gesture. Table 2 is a table representing an example data structure suitable to be the recipient of a lookup operation, where the table includes entries relating key-based gestures with commands to be processed by the keyboard application 150:

TABLE 2

| Gesture | Command |
| --- | --- |
| <swype> to <backspace> | "hide keyboard" |
| <swype> to <F> | "show numbers on keyboard" |
| <swype> to <globe> | "change language of keyboard" |
| <swype> to <T> and <W> | "post text to twitter" |
| <G> to <F> to <G> | "change font of text" |

Of course, one of ordinary skill in the art will appreciate that other key-based gestures and/or commands may be provided by the system.

In step 530, the system processes the identified command, and performs an action and/or function associated with the keyboard application based on the identified command. For example, the command component 240 receives an indication from the gesture component 220 that a user provided a key-based gesture associated with posting text to Twitter, and causes the keyboard to include a Twitter button to facilitate launching of a Twitter application when the user is ready to post.

That is, the system, in some cases, may receive an indication that a first key associated with two or more commands for performing actions within the keyboard application has been contacted by a user of the mobile device, may receiving an indication that a path has been traced by the user from the first key to a second key associated with one command of the two or more commands, and may perform the action associated with the second key.

Figure 6A:
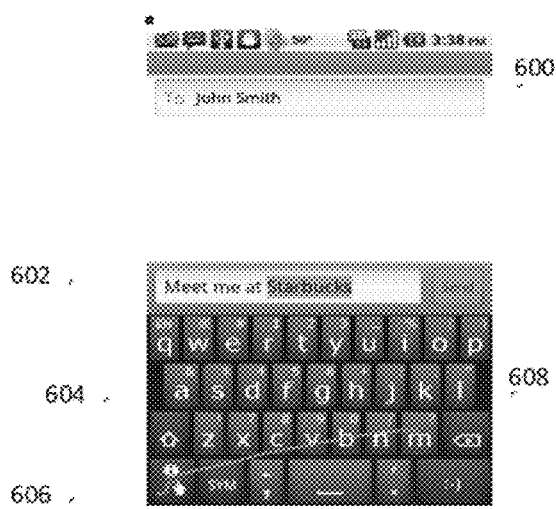
FIGS. 6A-6B are screen shots illustrating key-based gestures performed with respect to a displayed keyboard.
Figure 6B:
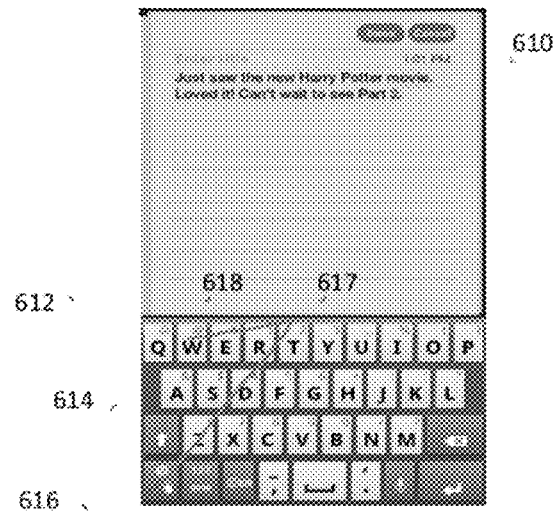

FIGS. 6A-6B are screen shots illustrating example key-based gestures that are associated with processing commands for a keyboard application. FIG. 6A depicts a display screen 600 having a virtual keyboard 602. While editing an email to a friend, a user wishes to add a map to provide directions to a location he is writing about. The user performs a gesture of tracing a path 604 from a "swype" key, or start key 606, to the "M" key, or end key 608. The system, in response to receiving the gesture, inserts a map into the email that provides directions to the location (not shown).

FIG. 6B depicts a display screen 610 having a virtual keyboard 612. A user has finished writing a message on her notepad, and wishes to communicate the message to a variety of social network sites of which she is associated. The user performs a gesture of tracing a path 614 from a start key 616, through a "T" key 617, and to a "W" key, or end key 618, where the path ends. The system, in response to receiving the gesture, changes the displayed virtual keyboard to operate in a "social networking" mode of operation, where keys are included that represent various social networking sites, such as Twitter or Facebook (not shown).

Thus, in some examples, the system facilitates enhanced navigation and greater functionality of a virtual keyboard by associating gestures with processing commands. Such gesture-based commands may enable users of mobile devices to easily input text, edit text, change modes of operation, navigate between applications supported by a device, and/or otherwise exploit the many capabilities of their mobile devices, among other benefits.

CONCLUSION

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above detailed description of embodiments of the system is not intended to be exhaustive or to limit the system to the precise form disclosed above. While specific embodiments of, and examples for, the system are described above for illustrative purposes, various equivalent modifications are possible within the scope of the system, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified. Each of these processes or blocks may be implemented in a variety of different ways. Also, while processes or blocks are at times shown as being performed in series, these processes or blocks may instead be performed in parallel, or may be performed at different times.

While many embodiments described above employ software stored on the mobile device (either before being given to a subscriber, or during a subscriber call), the scripts and other software noted above may be hard coded into the mobile device (e.g. stored in EEPROM, PROM, etc.). Further, the above functionality may be implemented without scripts or other special modules.

The teachings of the system provided herein can be applied to other systems, not necessarily the system described above. The elements and acts of the various embodiments described above can be combined to provide further embodiments.

All of the above patents and applications and other references, including any that may be listed in accompanying filing papers, are incorporated by reference. Aspects of the system can be modified, if necessary, to employ the systems, functions, and concepts of the various references described above to provide yet further embodiments of the system.

These and other changes can be made to the system in light of the above Detailed Description. While the above description details certain embodiments of the system and describes the best mode contemplated, no matter how detailed the above appears in text, the system can be practiced in many ways. Details of the local-based support system may vary considerably in its implementation details, while still being encompassed by the system disclosed herein. As noted above, particular terminology used when describing certain features or aspects of the system should not be taken to imply that the terminology is being redefined herein to be restricted to any specific characteristics, features, or aspects of the system with which that terminology is associated. In general, the terms used in the following claims should not be construed to limit the system to the specific embodiments disclosed in the specification, unless the above Detailed Description section explicitly defines such terms. Accordingly, the actual scope of the system encompasses not only the disclosed embodiments, but also all equivalent ways of practicing or implementing the system under the claims.

While certain aspects of the system are presented below in certain claim forms, the inventors contemplate the various aspects of the system in any number of claim forms. For example, while only one aspect of the system is recited as embodied in a computer-readable medium, other aspects may likewise be embodied in a computer-readable medium. Accordingly, the inventors reserve the right to add additional claims after filing the application to pursue such additional claim forms for other aspects of the system.

We claim:

1. A keyboard system stored in memory of a mobile device, the keyboard system comprising:
    a display component configured to present a virtual keyboard to a user via a touch-screen of the mobile device,
        wherein the virtual keyboard is configured to receive text input;
    a gesture component configured to receive a gesture via the virtual keyboard from a user of the mobile device,
        wherein the gesture includes movement across the virtual keyboard that could be interpreted as text entry;
    a context component configured to determine a context associated with the received gesture,
        wherein the context is separate from the content of the received gesture;

an interpretive component configured to identify whether the received gesture input in the determined context is a command for the keyboard system or is text entry,
  wherein the keyboard system is distinct from other applications stored in memory of the mobile device;
a text entry component configured to receive gesture input identified as text entry via the virtual keyboard and update text based on the received text entry; and
a command component configured to receive gesture input identified as a command for the keyboard system and to command the keyboard system to perform a function based on the received gesture,
  wherein the commanded function is not the function of a key displayed on the virtual keyboard.

2. The keyboard system of claim 1, wherein the gesture component is configured to receive a shape-based gesture from the user via the touch-screen of the mobile device,
  wherein the shape-based gesture is unassociated with specific keys of the keyboard; and
  wherein the command component is configured to command the keyboard system to change a mode of operation of the virtual keyboard based on the received shape-based gesture.

3. The keyboard system of claim 1, wherein the gesture component is configured to receive a shape-based gesture from the user via the touch-screen of the mobile device,
  wherein the shape-based gesture is unassociated with specific keys of the keyboard; and
  wherein the command component is configured to modify a font of text entered via the virtual keyboard based on the received shape-based gesture.

4. The keyboard system of claim 1, wherein the gesture component is configured to receive a key-based gesture from the user via the touch-screen of the mobile device; and
  wherein the command component is configured to change a mode of operation of the virtual keyboard based on the received key-based gesture.

5. The keyboard system of claim 1, wherein the gesture component is configured to receive a key-based gesture from the user via the touch-screen of the mobile device; and
  wherein the command component is configured to modify a font of text entered via the virtual keyboard based on the received key-based gesture.

6. The keyboard system of claim 1, wherein the gesture component is configured to receive a user-defined gesture from the user via the touch-screen of the mobile device.

7. The keyboard system of claim 1, wherein the command component is configured to change one or more keys displayed by the virtual keyboard based on the received gesture.

8. The keyboard system of claim 1, wherein the command component is configured to hide the virtual keyboard based on the received gesture.

9. The keyboard system of claim 1, wherein the command component is configured to change a font of text displayed via the virtual keyboard based on the received gesture.

10. A method performed by a mobile device for commanding a keyboard application, the method comprising:
  receiving a gesture on a keyboard displayed by the keyboard application via a touch-screen of the mobile device,
    wherein the displayed keyboard is configured to receive text input, and
    wherein the gesture includes movement across the displayed keyboard that could be interpreted as text input;
  identifying a context associated with the received gesture,
    wherein the context is separate from the content of the received gesture;
  determining whether the received gesture in the identified context comprises a command associated with a function to be performed by the keyboard application,
    wherein the keyboard application is distinct from other applications of the mobile device;
    wherein the function changes the display of the keyboard; and
    wherein the function is not the function of a key on the keyboard;
  when the received gesture input is determined not to comprise a command for the keyboard application, then:
    accepting the received gesture input as text input for facilitating the entry of text; and
  when the received gesture input is determined to comprise a command for the keyboard application, then:
    intercepting the received gesture input, such that the gesture input is not accepted as text input; and
    commanding the keyboard application to perform the function associated with the received command gesture.

11. The method of claim 10, wherein the received gesture is a path traced from a first key of the keyboard to a second key of the keyboard.

12. The method of claim 10, wherein the received gesture is a shape traced on or proximate to the keyboard displayed by the keyboard application, wherein the shape is unassociated with any keys of the keyboard.

13. The method of claim 10, wherein the received gesture is a shape traced on or proximate to the keyboard and an associated text entry field displayed by the keyboard application, wherein the shape is unassociated with any keys of the keyboard.

14. The method of claim 10, wherein commanding the keyboard application to perform a function associated with the received gesture includes commanding the keyboard application to perform an action that changes a mode of operation of the keyboard application.

15. The method of claim 10, wherein commanding the keyboard application to perform a function associated with the received gesture includes commanding the keyboard application to perform an action that changes one or more keys of the keyboard displayed by the keyboard application.

16. A non-transitory computer-readable medium whose contents, when executed by a mobile device, cause the mobile device to perform a method for commanding a keyboard application of the mobile device, the method comprising:
  receiving an indication that a first letter key has been contacted by a user of the mobile device via a keyboard displayed by the keyboard application; receiving an indication that a path has been traced by the user from the first letter key to a second letter key displayed by the keyboard application; identifying a context associated with the traced path,
  wherein the context is separate from the content of the traced path determining whether the traced path is associated with a command for performing an action within the keyboard application in the identified context,
    wherein the keyboard application is distinct from other applications of the mobile device; and
    wherein the action is not the function of a key displayed on the keyboard or a function of facilitating the entry of text;
  when the traced path is determined not to be associated with a command for the keyboard application, then: accepting the traced path as text input; and
  when the traced path is determined to be associated with a command for the keyboard application, then: performing the action associated with the command within the keyboard application.

17. The non-transitory computer-readable medium of claim 16, wherein performing an action associated with the traced path within the keyboard application includes performing an action specific to an application currently running on the mobile device.

18. The non-transitory computer-readable medium of claim 16, wherein performing an action associated with the traced path within the keyboard application includes performing an action that changes a current mode of the keyboard application to an alternative mode of the keyboard application.

19. The non-transitory computer-readable medium of claim 16, wherein performing an action associated with the traced path within the keyboard application includes performing an action that modifies a font of text input by the user of the mobile device via the keyboard application.

20. The keyboard system of claim 1, wherein the received gesture can be identified as a first command or a second command, and the interpretive component utilizes the determined context information to identify the received gesture as the first command.

21. The keyboard system of claim 1, wherein the commanded function can be performed in more than one way, and the interpretive component utilizes the determined context information to determine how to perform the commanded function.

* * * * *